United States Patent [19]
Atkinson et al.

[11] Patent Number: 5,093,856
[45] Date of Patent: Mar. 3, 1992

[54] APPARATUS AND METHOD FOR DETERMINING INCOMING CALL DESTINATION WITH IMPROVED SECURITY

[75] Inventors: Lowell G. Atkinson, Indianapolis; Nathan W. Engle, Bloomington; Donald L. Hornback, Indianapolis, all of Ind.

[73] Assignee: AT&T Bell Laboratories, Murray Hill, N.J.

[21] Appl. No.: 603,084

[22] Filed: Oct. 24, 1990

[51] Int. Cl.⁵ ............................................ H04M 11/00
[52] U.S. Cl. ..................................... 379/95; 379/102
[58] Field of Search .............. 379/40, 45, 46, 48–50, 379/93, 95, 102, 104–107

[56] References Cited

U.S. PATENT DOCUMENTS

| | | |
|---|---|---|
| 4,097,696 | 6/1978 | Nyhuis et al. |
| 4,394,540 | 7/1983 | Willis et al. ........................ 379/107 |
| 4,477,697 | 10/1984 | Judd et al. ........................ 379/252 |
| 4,520,233 | 5/1985 | Smith ................................ 379/95 |
| 4,546,213 | 10/1985 | Dick .................................. 379/95 |
| 4,582,956 | 4/1986 | Doughty . |
| 4,660,218 | 4/1987 | Hashimoto ........................ 379/93 |
| 4,791,658 | 12/1988 | Simon et al. ..................... 379/41 |
| 4,949,372 | 8/1990 | Steele ................................ 379/46 |

FOREIGN PATENT DOCUMENTS 1-25634  11/1989  Japan ..................................... 379/95

OTHER PUBLICATIONS

J. Holmes, "Securing Dial-Up Networks", *Telecommunications*, Mar. 1984, pp. 84, 124.

Primary Examiner—James L. Dwyer
Assistant Examiner—Wing F. Chan
Attorney, Agent, or Firm—Michael A. Morra

[57] ABSTRACT

At a telephone subscriber's premises, call identification apparatus is used to determine whether incoming calls are intended for a primary telephone station or for a secondary telephone station. The call identification apparatus monitors electrical signals present on a telephone line after the call has been answered by one of the secondary telephone stations in search of a predetermined identification signal. In response to the presence of the identification signal from an originating source, the apparatus disconnects all secondary stations from the telephone line, terminates the incoming call by hanging up, and dials a predetermined telephone number. After dialing the predetermined number, an authentication procedure is invoked which requires that the dialed station transmit a security code to the apparatus. If the dialed station incorrectly transmits the security code more than N times, the call is terminated. Illustratively, the primary station comprises a home security system plus the call identification apparatus within a single unit.

9 Claims, 7 Drawing Sheets

| FIG. 3A | FIG. 3B | FIG. 3C |

APPARATUS AND METHOD FOR DETERMINING INCOMING CALL DESTINATION WITH IMPROVED SECURITY

TECHNICAL FIELD

This invention relates to a method and apparatus for determining incoming call destination, and more particularly to automatic answering equipment that selectively responds to specific callers.

BACKGROUND OF THE INVENTION

As the number of devices that share a telephone line at a business or residence location increases, maintaining compatibility between them frequently becomes a problem. For example, telephone answering devices and facsimile machines cannot normally share the same telephone line because one or the other will dominate incoming calls by being the first to respond to a ringing signal. Consequently, facsimile machines generally use a separate telephone line which means additional wiring and expense.

U.S. Pat. No. 4,582,956 was issued on Apr. 15, 1986, to Carolyn Doughty and suggests one solution to the problem of selecting a particular automatic answering station when many share a common telephone line. Apparatus at a telephone company central office, such as Automatic Number Identification (ANI) equipment, encodes the telephone number of a calling party and transmits it to each called party that subscribes to a Call Identification service. This service, although growing in acceptance, has not been without controversy. In this service, frequency shift keyed signals carrying the calling party telephone number are transmitted during a silent interval between ringing. This information is displayed to the called party so that the identity of the calling party is known prior to answering the telephone. This information can also be used to select one particular station on the telephone line to respond to the incoming call. However, this service is not available everywhere; a monthly fee must be paid; and the calling party's telephone number does not necessarily reveal the desired receiving station.

Telephone Call Directors provide another solution by answering all incoming calls, identifying the nature of the call, and then interconnecting the incoming call with the proper destination. While such equipment advantageously minimizes the number of incoming lines, it is intrusive and is primarily useful in a business application for reasons of cost, size and wiring layout. Call Directors have found little acceptance in a home environment where, perhaps, only one additional answering device needs to share a common telephone line.

U.S. Pat. No. 4,949,372 was issued on Aug. 14, 1990 to D. C. Steele and discloses a technique for ascertaining whether an incoming call is intended for a local security system terminal which shares a telephone line with other automatic answering equipment. The telephone line is continuously monitored for the presence of a unique tone pair whose presence enables communication with the security system. Although this technique is useful, it is still susceptible to intrusion by unauthorized callers who can easily transmit a pair of audio frequency tones.

In another well-known technique, a central security monitoring facility calls the local security system terminal, but then only allows a small number of rings to occur (frequently just one). Other automatic answering equipment which shares the telephone line is not activated by this small number of rings; but the local security system is now primed to seize the line the next time that ringing commences (if within a very brief time interval). Unfortunately, this technique is readily duplicated by unauthorized persons seeking access to the local security system, and often responds to other calling parties who inadvertently duplicate the sequence.

It is particularly desirable to add security system equipment to the same telephone line at a subscriber's premises having a facsimile machine or a personal computer modem connected thereto. Modern security equipment, being remotely programmable, must interact with a central security monitoring facility so that its status can be verified or changed as the need arises. It is generally unacceptable to wait until the security system is next scheduled to report to its monitoring facility before its programming can be modified or functional tests performed. Accordingly, an arrangement that allows security system equipment to share a telephone line with other automatic answering equipment, without interference, would be of great benefit. Further, the security system must be sufficiently robust to preclude unauthorized persons from accessing the security system over the telephone line.

SUMMARY OF THE INVENTION

The present invention solves the problem of determining whether an incoming call is intended for a primary or a secondary station by providing call identification apparatus that monitors the telephone line for a predetermined identification signal transmitted by the calling party after the call has been answered. In response to the presence of the identification signal, the apparatus terminates the call and dials a predetermined telephone number.

In a preferred embodiment of the invention the predetermined identification signal is a conventional ANSWER tone (2025 Hz). In this embodiment, the call identification apparatus verifies that the tone originated at the distant end by testing whether the 2025 Hz tone continues to be present on the telephone line after the secondary stations have been disconnected.

In an illustrative embodiment of the invention, the primary station comprises a home security system whose integrity is further improved by an authentication procedure which is invoked after the predetermined telephone number is dialed. The authentication procedure requires that the correct security code be transmitted to the home security system within N tries. Other benefits offered by the present invention will be more fully understood when reference is made to the accompanying drawing and detailed description.

DETAILED DESCRIPTION

Figure 1:
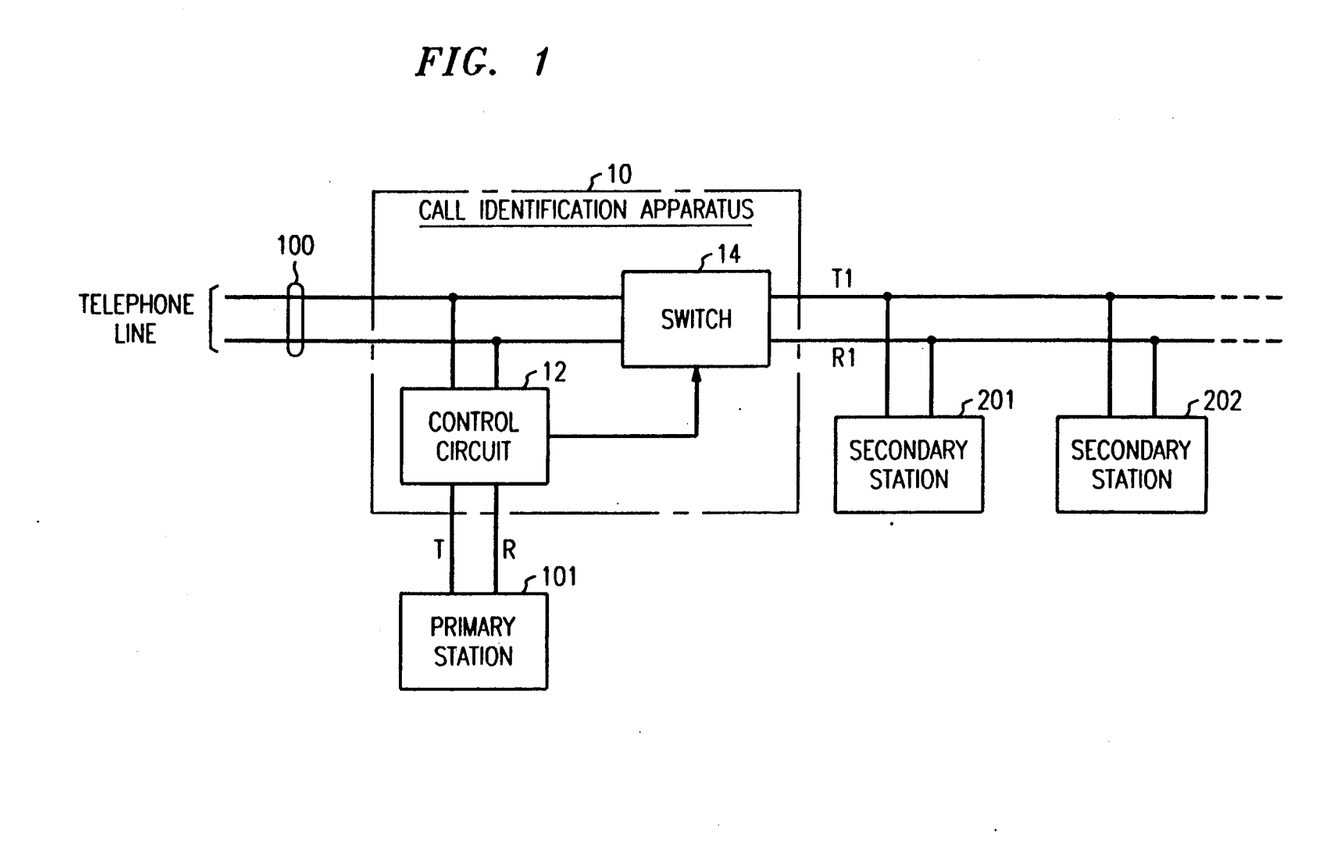
FIG. 1 is a block diagram showing a subscriber's premises having various stations that share a common telephone line, and use Call Identification Apparatus in accordance with the invention.

FIG. 1 discloses the present invention in block diagram form and provides a generalized view of its overall operation. At a subscriber's premises, a number of stations 101, 201, 202 share a single incoming telephone line 100. One of these stations (101) is selected as being more critical than the others and is designated as the "primary" station while all others are designated as "secondary" stations. In an illustrative embodiment of the invention, primary station 101 comprises home security equipment; however, a utility meter or a personal computer might just as easily have been chosen. Secondary stations 201, 202 share the property that they can all be disconnected from the incoming line by call identification apparatus 10 when service is being provided to the primary station. Call identification apparatus 10 may be constructed as a stand-alone device or incorporated into the design of the primary station. The latter is preferred for cost and size considerations, particularly in connection with home security equipment which generally receives priority treatment. Included within the call identification apparatus is a control circuit 12 which monitors electrical signals on the telephone line 100 for a predetermined identification signal after one of the secondary stations 201, 202 has answered an incoming call. Frequently the identification signal comprises a tone, or tone sequence, that may have come from one of the secondary stations 201, 202 rather than from the calling party at the distant end of telephone line 100. So that this condition might be recognized, control circuit 12 activates switch 14 to temporarily disconnect the secondary stations, and to test whether the identification signal is still present on the telephone line. If it is, then it is assumed that the incoming call was intended for the primary station 101 and the secondary stations remain disconnected. If the identification signal disappears after the secondary stations 201, 202 are disconnected, then it is assumed that the incoming call was not intended for the primary station and switch 14 is deactivated to reconnect the secondary stations to the telephone line. This brief test is virtually unnoticed by the secondary stations so that the operation is deemed to be unobtrusive. In the event that the call is intended for the primary station, but the subscriber answers the incoming call first, the subscriber is immediately disconnected and only suffers the inconvenience of answering a call where there is no apparent caller. Subscribers are told of this minor inconvenience which occurs infrequently. During normal operation, the home security system makes periodic (daily or weekly) outgoing calls to a monitoring facility to report its status and to receive new programming instructions. Nevertheless, there are times when the home security system must be called by the monitoring facility and it is critical that this communication not be delayed. The primary station is typically set to automatically answer incoming calls only after a large number of rings so that when other automatic answering equipment shares the telephone line, the primary station will be unnoticed.

Figure 2:
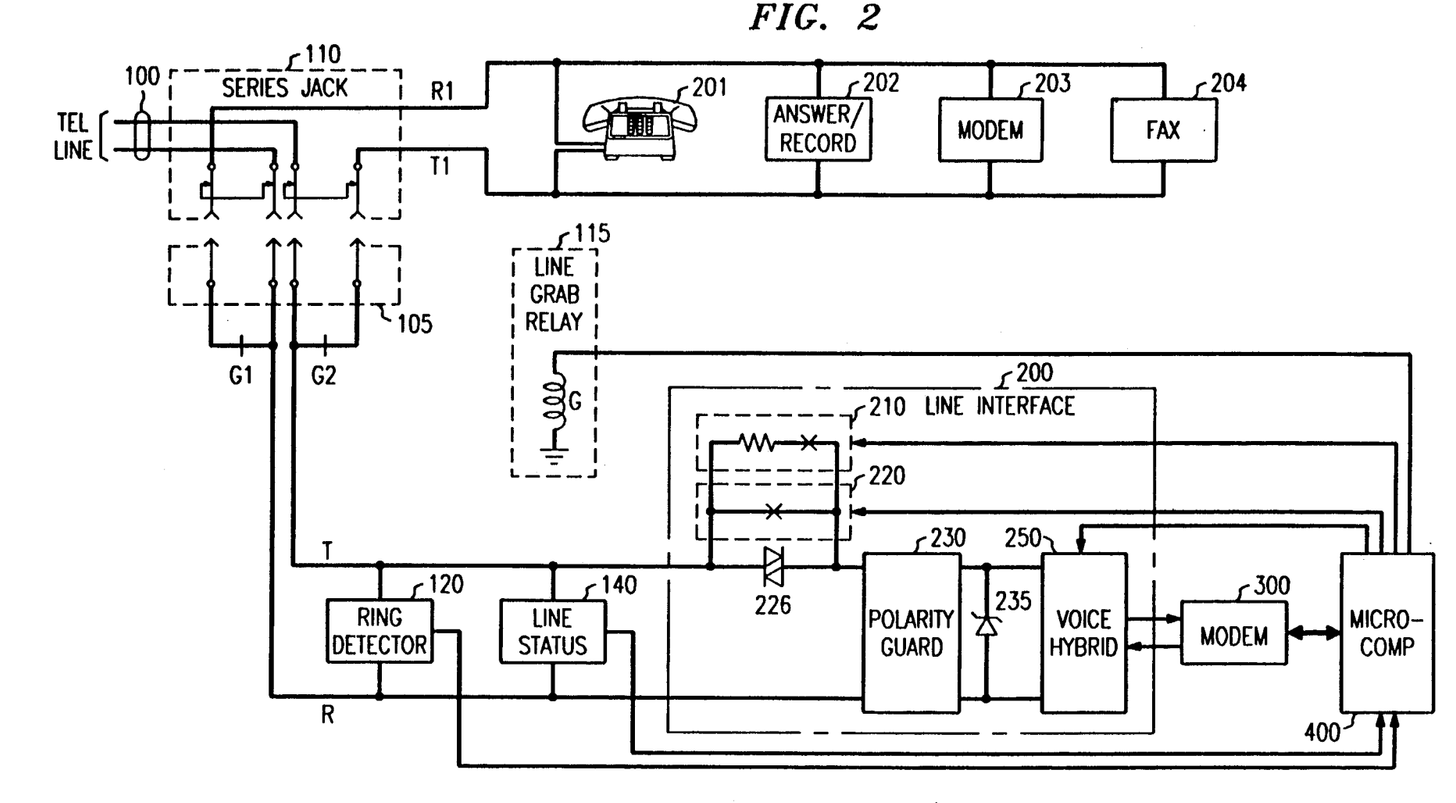
FIG. 2 is a block diagram showing certain functional detail of the Call Identification Apparatus in accordance with the invention.

FIG. 2 discloses a general block diagram of a call identification system in accordance with the invention. Series jack 110 facilitates interconnection between incoming telephone line 100 and various devices connected thereto. The present invention is incorporated into a home security system which inserts into series jack 110 via electrical plug 105. Once plug 105 is inserted, the capability of disconnecting all secondary devices 201-204 from the telephone line resides in the equipment attached to plug 105 which, in the present design, is the home security system. Naturally, the present invention can be incorporated into another device such as a telephone answering machine or a facsimile machine, but giving priority to security equipment makes more sense. Line grab relay 115, under the control of microcomputer 400, includes break contacts G1, G2. These electrical contacts are normally closed so that the secondary stations 201-204 are all electrically connected to the telephone line along with the security equipment. When line grab relay 115 is operated, however, secondary stations 201-204 are removed from the incoming telephone line 100 but the home security system remains connected.

Referring once again to series jack 110, when plug 105 is not inserted into the jack, a shorting bar therein routes leads T1, R1 to telephone line 100. Suitable jacks include the RJ31X or the RJ38X which are miniature 8-position series jacks commercially available from a number of suppliers. Connected to plug 105 are certain well known circuits that perform functions useful in practicing the invention. These circuits are illustratively shown as blocks in FIG. 2, and disclosed in greater detail in FIG. 3.

Ring detector 120 operates to detect an alerting (ringing) signal present on telephone line 100. Ring detector 120 furnishes a binary signal to microcomputer 400 having one state when ringing is present and another state when it is not. Line status indicator 140 responds to the differential voltage on the telephone line leads T, R to determine whether the telephone line is busy or idle (i.e., whether any of the secondary devices 201-204 are in the off-hook state). Such information is furnished to microcomputer 400. Line interface 200 includes a high-voltage (240 V) varistor 226 which protects electronic switches 210, 220 from high voltages on the telephone line. Polarity guard 230 provides full wave rectification of the DC voltages on leads T, R to provide a constant polarity on the circuits that follow. Zener diode 235 is used to protect from high-voltage surges on the telephone line while voice voice hybrid 250 provides directional coupling (i.e., 2-wire to 4-wire conversion) of signals between modem 300 and telephone line 100. Modem 300 is used for transmitting and receiving binary data at a 300 baud rate. The transmitting portion of the modem converts binary digital data into a form suitable for transmission over the telephone line while the receiving portion of the modem converts signals received from the telephone line into binary digital data signals present on the telephone line. Modem 300 also performs the critical function of detecting the presence of a 2025 Hz tone which is used to signify that an incoming call is intended for the home security system. The presence of the 2025 Hz tone is provided to microcomputer 400 which performs tests to determine whether this particular tone came from the calling party at the distant end of telephone line 100, or if it originated from one of the secondary stations 201-204.

At this point it is noted that microcomputer 400 is programmed to provide (i) home security functions such as the monitoring of various sensors (smoke detector, window open/closed, door open/closed etc.), and (ii) the call identification function. The economy of combining the above functions within the same microcomputer makes it possible to incorporate the present invention into a number of automatic answering devices. A suitable device is the PD70320 (V25) 16-bit CMOS microcomputer which is commercially available from NEC Electronics Inc. This single-chip microcomputer includes a 16-bit ALU and 256 bytes of RAM. External memory supporting microcomputer 400 includes a 128K byte (128K × 8 bit) EPROM. A suitable device is the 27CO10 which is commercially available from Texas Instruments.

Figure 3:
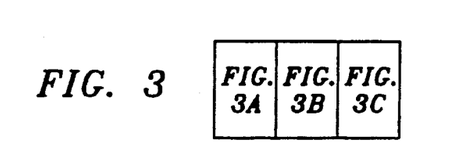
FIG. 3 shows the interconnection of FIGS. 3A, 3B, 3C.
Figure 3A:
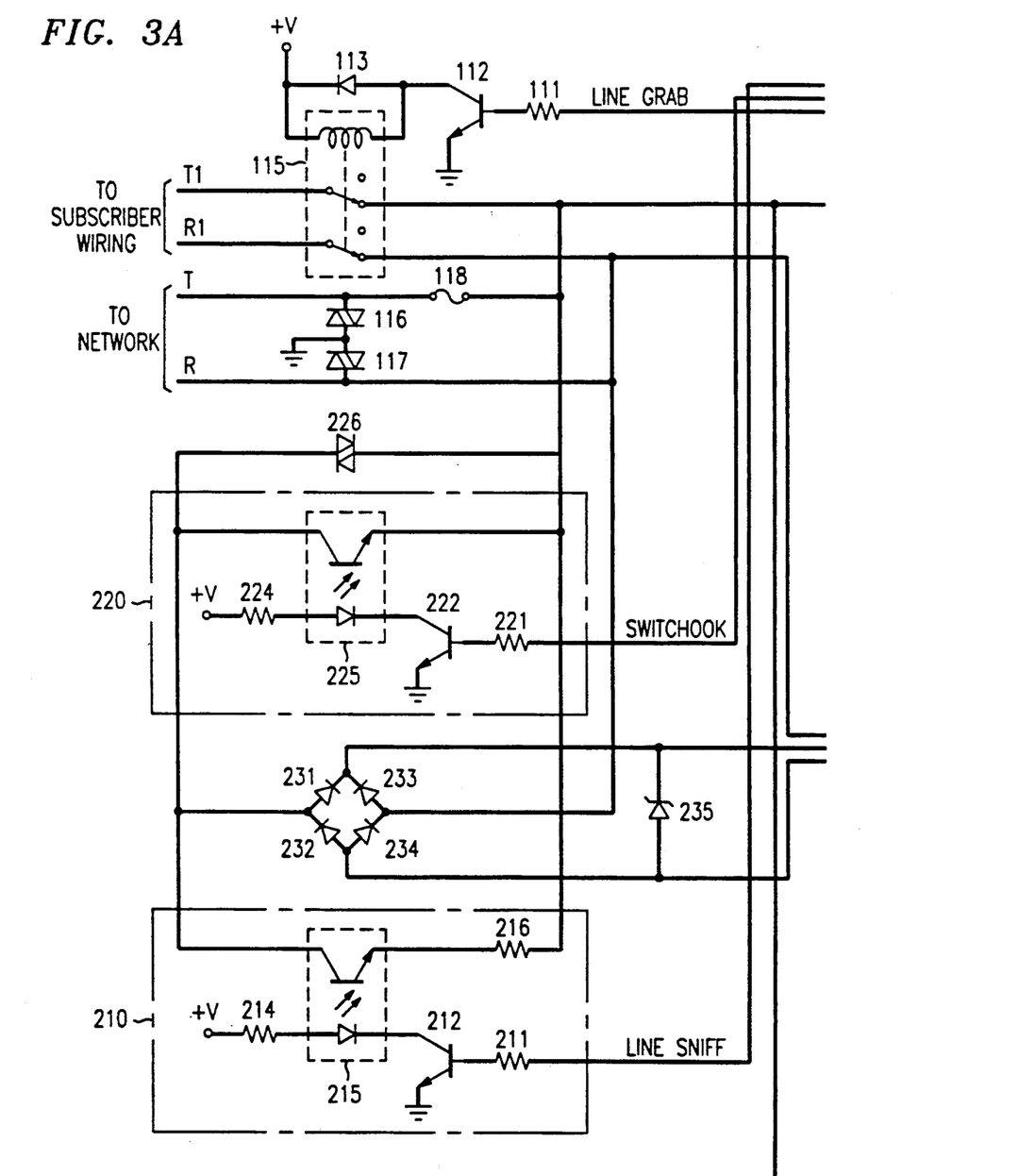
FIGS. 3A, 3B, 3C is a schematic drawing of the present invention showing the Call Identification Apparatus in greater detail.
Figure 3B:
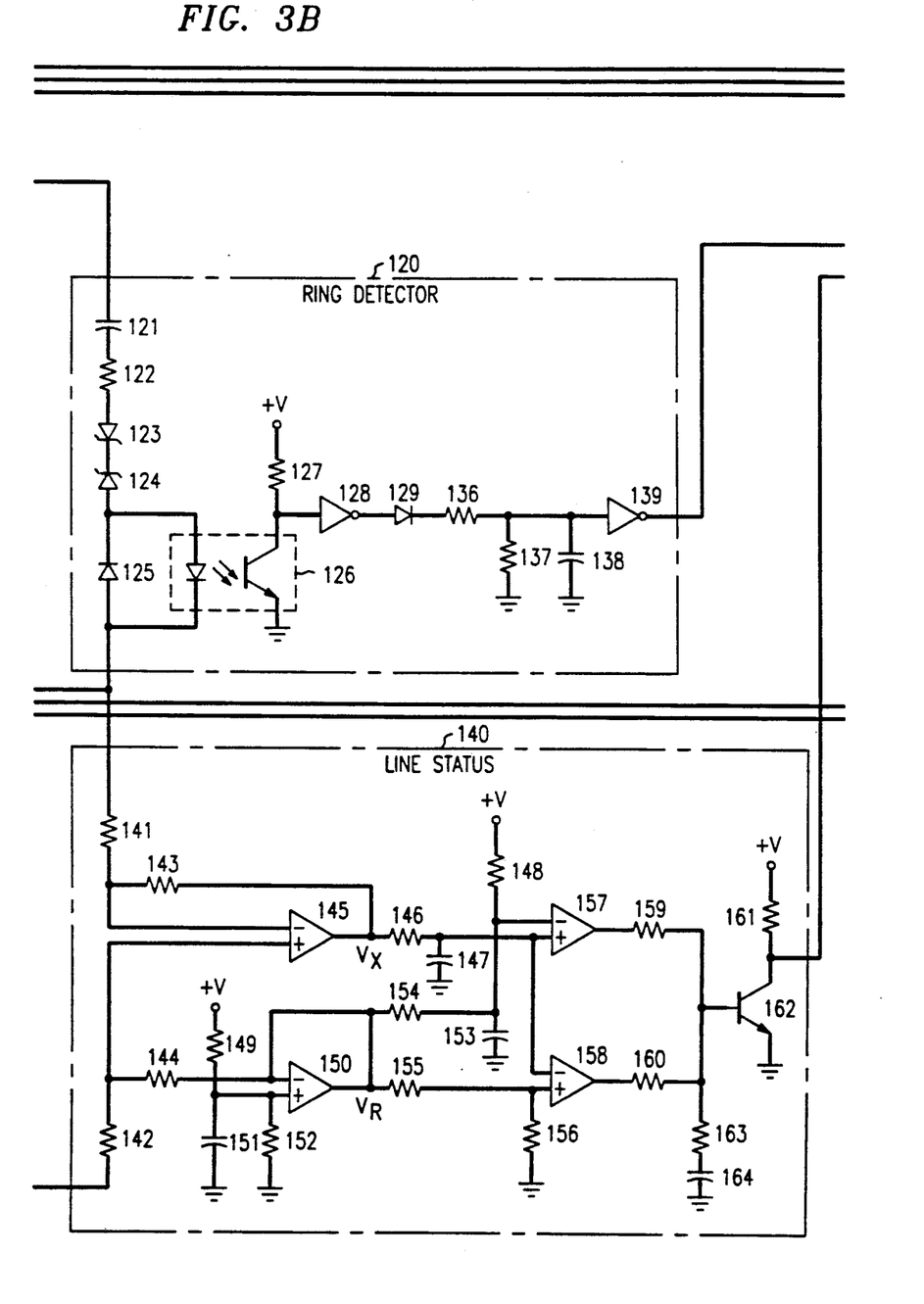
Figure 3C:
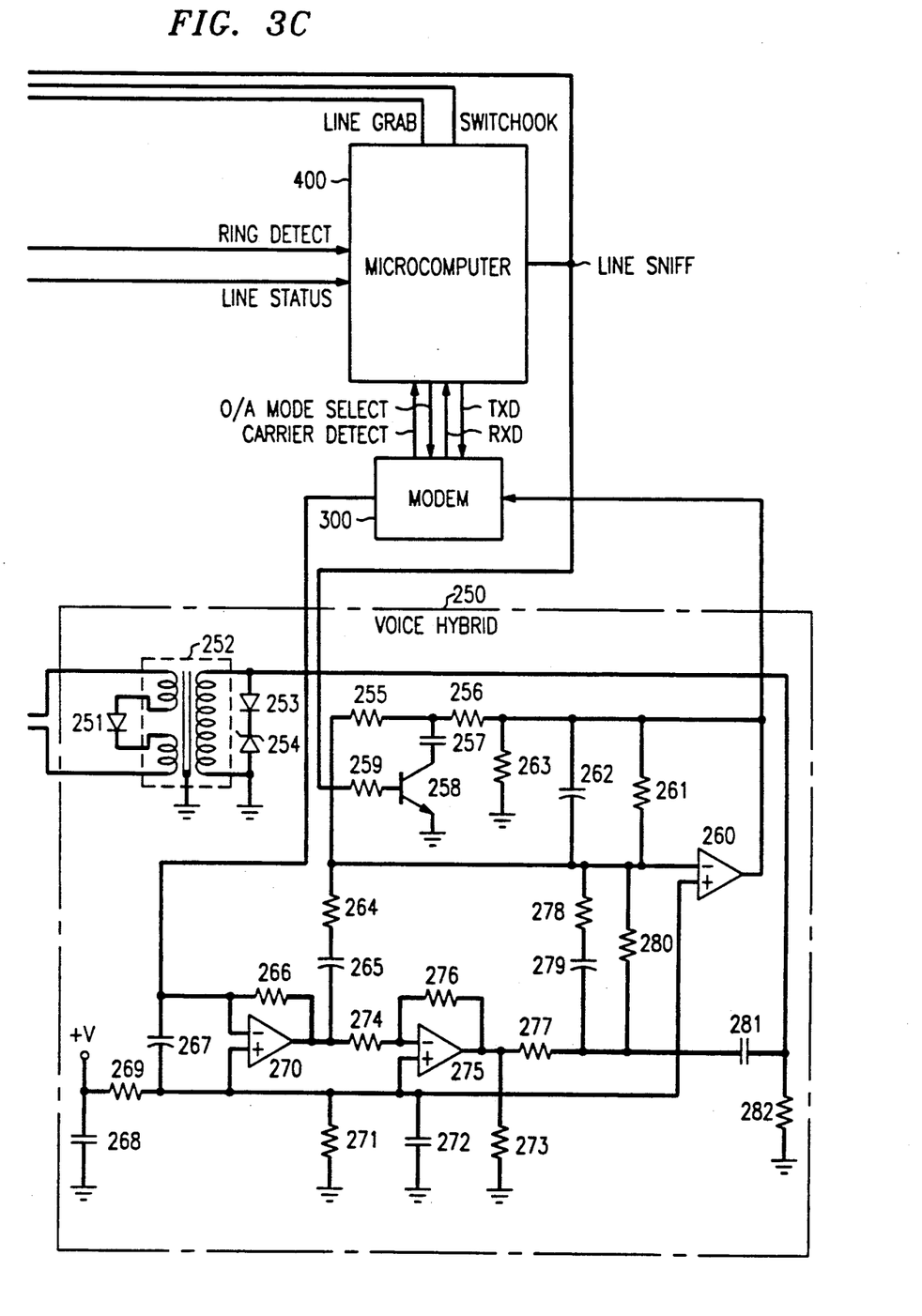

Referring now to FIG. 3, each of the various blocks are described in greater detail.

Ring Detector

Responsive to ringing signals present on telephone line leads designated T, R, ring detector 120 includes capacitor 121 and resistor 122 for ac coupling such signals to the detector. Zener diodes 123, 124 have a reverse breakdown of 18 volts each so that signals whose peak voltage exceeds 18 volts are rectified by diode 125 and applied to optical coupler 126. An optical coupler is used to isolate high voltage signals, possibly present on the telephone line, from the ring detector. Additionally, the use of an optical coupler renders the ring detector insensitive to DC voltage variations on the telephone line. The optical coupler is turned on during alternate half cycles of the ringing signal. When ringing signals are not present, the input to inverter 128 is high (approximately 5 volts) and its output is low (approximately 0 volts). When ringing is present, however, the output of inverter 128 becomes high on alternate half cycles and causes capacitor 138 to charge via diode 129 and resistor 136. The charging rate is determined by the RC time constant of capacitor 138 and the parallel combination of resistors 136, 137. Owing to the presence of diode 129, the discharging rate is determined only by the RC time constant of resistor 137 and capacitor 138. Inverter 139 buffers the voltage present on capacitor 138 from the input impedance of microcomputer 400 which receives a low signal when ringing is present and a high signal otherwise.

Line Status

Line status circuit 140 provides an indication to microcomputer 400 regarding the status of other devices sharing the telephone line (i.e., whether they are on-hook or off-hook). To accomplish this, the differential voltage on the telephone line is monitored. The telephone line voltage is coupled through resistors 141, 142 which form a high impendance into differential amplifier 145. This amplifier has a gain of approximately 0.03 and a wide common range so that its output $V_x$, with respect to a local reference $V_r$, is a reduced version of the differential voltage. Reference voltage $V_r$, is generated by resistor voltage divider 149, 152 and buffered by operational amplifier 150. Upper and lower threshold voltages are generated from $V_r$, by voltage dividers comprising resistors 148, 154 and 155, 156 respectively. Output voltage $V_x$, is filtered by resistor 146 and capacitor 147 and then compared with the upper and lower threshold voltages in comparators comprising operational amplifiers 157, 158. The two comparator outputs are compared in an OR logic circuit comprising resistors 159, 160, and transistor 162 to signal microcomputer 400 of the line status. On-hook indication is given when $V_x$ is between the upper and lower thresholds (T-R voltages with absolute values greater than 24 volts), and off-hook indication is given when $V_x$ is outside of the thresholds (T-R voltages with absolute values less than 18 volts).

Identification Signal Detector (Modem Function)

The need for an identification signal detector is based on the need to determine that an incoming telephone call is intended for the primary station. A unique identification signal is present on the telephone line after the incoming call has been answered. In the present invention, circuitry for recognizing the identification signal is contained within modem 300 which is a commercially available device such as the MM74HC943 (a 300 baud modem) available from National Semiconductor Corporation. This particular modem operates full duplex and is compatible with AT&T 103-type equipment. Included within this modem is circuitry for detecting various tones including 1070 Hz, 2025 Hz, 1270 Hz, and 2225 Hz. One pair of tones (e.g., 1070 Hz and 1270 Hz) is used for transmitting frequency shift keyed (FSK) data in one direction while the other pair of tones (2025 Hz and 2225 Hz) is used for transmitting FSK data in the other direction. Note that two narrowband data channels are formed that do not overlap in frequency, fit within the voice frequency band used for conventional telephone service, and may exist simultaneously on the same telephone line without interference. Conventionally, the modem that originates a telephone call transmits the low-frequency pair, and the modem that answers the telephone call transmits the high-frequency pair. In the present invention, however, the Originate modem transmits one of the high frequency tones (2025 Hz) for identification purposes. This condition has the property of being unique in that it deviates from the expected allocation of tones and signifies that this incoming telephone call is destined for the primary station. First, however, the call identification apparatus must test to determine if this tone is truly coming from the distant end rather than from one of the secondary stations 202–204 (see FIG. 2) that might also generate the 2025 Hz ANSWER tone. As discussed above, the secondary stations are briefly disconnected form the telephone line while a test for the presence of the 2025 Hz tone is made. Clearly, other identification signals can be used so that the need for temporary disconnection of the secondary stations is obviated. Since AT&T 103-type modems are already used for data communication in the security industry, and since causing the Originate modem to act as though it were the Answer modem is a simple matter, the present invention advantageously modifies the AT&T 103 tone allocations to provide a unique identification signal without the need for generating and detecting a new, custom signal format. The O/A Mode Select input to modem 300 allows microcomputer 400 to operate in either the Originate or the Answer mode. Binary data is exchanged between the modem and the microcomputer over leads that are not shown. The information content of the binary data from the subscriber premises includes system status, event history, and memory configuration; while reprogramming data is frequently transmitted from the monitoring facility. Binary data to be transmitted is converted into FSK signals by modem 300 and delivered to voice hybrid 250 on lead TXD. FSK signals received over the telephone line are delivered to the modem on lead RXD.

Voice Hybrid

Voice hybrid 250 provides directional coupling (2-wire to 4-wire conversion) between telephone line 100 and modem 300. Switching apparatus may be included to disconnect the modem from the voice hybrid and connect a telephone handset thereto so that voice communication can be provided.

Voice hybrid 250 comprises a transmitting amplifiers 270, 275 which drives the telephone line through resistor 277, capacitor 281, and transformer 252; a receive amplifier 260; and a sidetone balancing network. A filtered reference voltage is supplied to the non-inverting input of transmitting amplifiers 270, 275 through capacitors 268, 272 and resistors 269, 271. Capacitor 267 provides high frequency roll off for amplifier 270, and resistor 266 limits the gain of amplifier 270. The output signal of amplifier 270 is DC coupled to amplifier 275 whose gain is set by the ratio of resistors 274, 276 and then presented to the telephone line via resistor 277 and capacitor 281. Resistor 282 provides a suitable AC termination for the telephone line. A portion of the transmit signal from amplifier 270 is coupled to the receive amplifier 260 via capacitor 265 and resistor 264 in order to regulate sidetone balance. It is noted that transmitted and received signals are both presented to amplifier 260 via resistor 280 and the path including resistor 278 and capacitor 279.

A 600:600 ohm transformer 252 couples audio frequency electrical signals from the telephone line side to the locally powered voice hybrid 250. Diode 251 increases the DC resistance of the voice hybrid for compatibility with other parallel stations. Diodes 253, 254 limit transients that would overload the voice hybrid. Signals received from the telephone line are amplified by differential amplifier 260 which provides two different levels of gain. In what is called the "line sniff" mode, it is desirable to bridge the telephone line with high impedance switch 210. Additional gain is required from voice hybrid 250 during the "line sniff" mode which is achieved by changing the negative feedback in amplifier 260. The gain of amplifier 260 is related to the magnitude of the signal at its output that is delivered back to its inverting input (negative feedback). Some of this feedback is delivered via resistor 261 and capacitor 262. The rest of the feedback is delivered via resistors 255, 256. In the "line sniff" mode, a signal from microcomputer 400 turns on transistor 258 through resistor 259 thereby eliminating that portion of the negative feedback delivered via resistors 255, 256. Accordingly, the overall gain of the voice hybrid is increased because negative feedback in amplifier 260 is decreased. The "line sniff" mode is entered after ringing has been detected and the call has been answered by another station sharing the telephone line.

High impedance switch 210 allows signals present on the telephone line to be bridged around varistor 226 with a circuit comprising resistor 216 and optical coupler 215. During the "line sniff" condition, a signal from microcomputer 400 is presented to high impedance switch 210 via resistor 211 which turns on transistor 212 and activates optical coupler 215. Resistor 214 limits the amount of current flowing through the optical coupler. Resistor 216 thus bridges high voltage varistor 226 during the "line sniff" mode so that signals present on the line can be delivered to the voice hybrid circuit.

Low impedance switch 220 operates in a manner similar to high impedance switch 210 under control of microcomputer 400. A switchhook output signal from the microcomputer is delivered to low impedance switch 220 via resistor 221 and transistor 222 to activate optical coupler 225. DC current through the optical coupler is limited by means of resistor 224. When the optical coupler 225 is turned on, a low impedance is placed in parallel with high voltage varistor 226 thereby causing DC current to flow through the telephone line—thus simulating the operation of a conventional telephone switchhook. Consequently, low impedance switch 220 is also known as an electronic switchhook which can be used for answering an incoming telephone call or for pulse dialing.

Line Grab

Microcomputer 400 is capable of seizing the telephone line and disconnecting the secondary stations as discussed above. A signal from microcomputer 400 on its line grab output activates the line grab relay 115 (G relay) via resistor 111 and transistor 112. Diode 113 is used to reduce high voltage transients when relay 115 is released. Note that when relay 115 is operated, all stations connected to leads T1, R1 are disconnected from the incoming telephone line. Varistors 116, 117 are used to limit the voltage magnitude present on leads T, R while fuse 118 protects all equipment connected to the telephone line from current surges.

Figure 4:
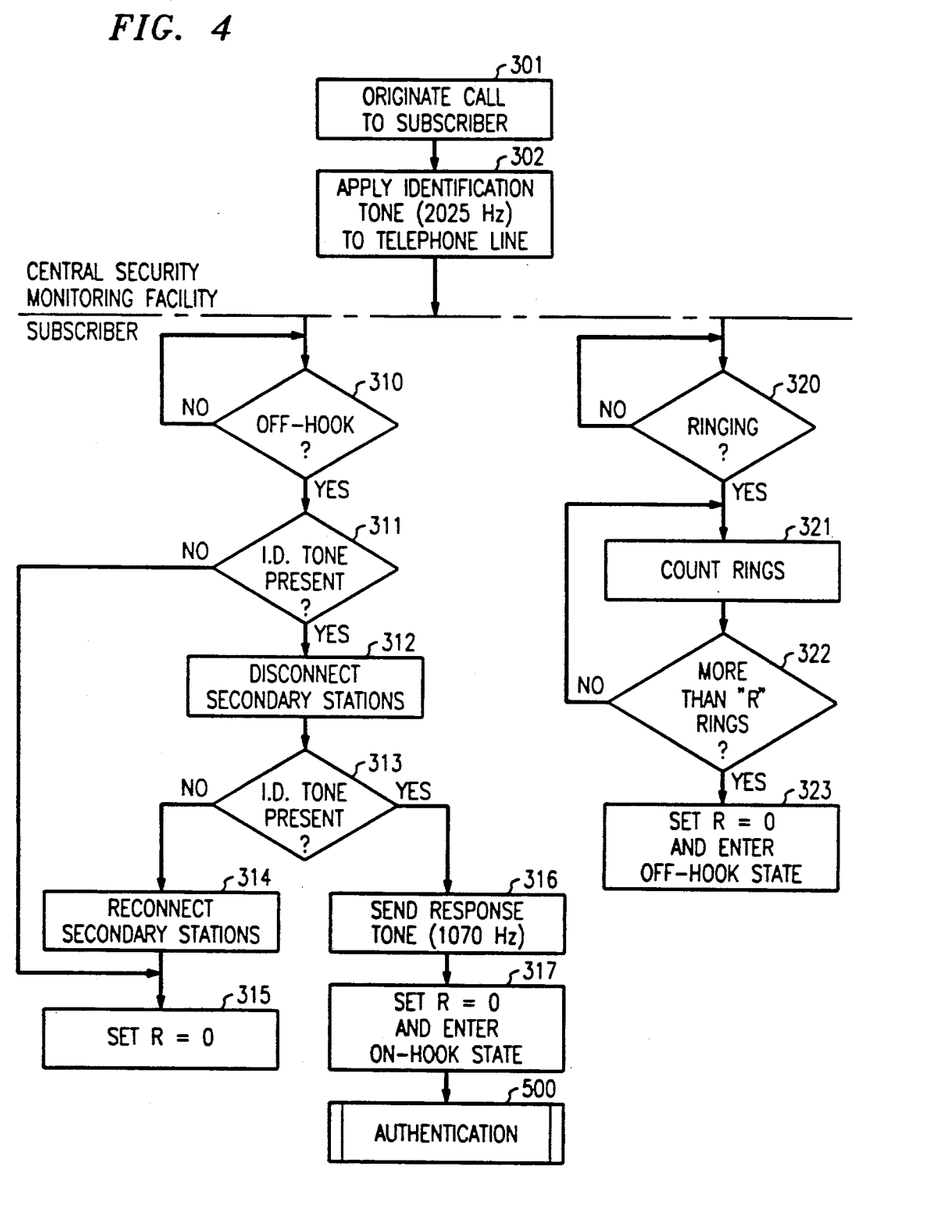
FIG. 4 discloses a flow diagram useful in defining the steps taken by a microcomputer used to implement the invention.

Referring now to FIG. 4, a flow diagram is shown illustrating the sequential steps taken in the implementation of the present invention. The steps shown in FIG. 4 are carried out by circuits shown in FIG. 3 so that both figures should be considered together.

In the preferred embodiment of the invention, the steps taken at the subscriber location, as indicated in FIG. 4, are executed by microcomputer 400 under instructions stored in memory. A telephone call is originated by a central security monitoring facility seeking to communicate with a particular subscriber's home security system. This action is indicated in block 301. As shown in block 302, a 2025 Hz tone is applied to the telephone line by the monitoring facility after dialing is completed. The remaining steps take place at the subscriber's premises. A home security system generally does not automatically answer an incoming call until after a relatively large number of rings (R) has occured. A typical number for R might be 10 or more. This gives preference to other automatic answering stations that share the telephone line so that the home security system will not interfere with their operation. Blocks 320-323 are illustrative of the steps taken in the event that the home security system actually answers the call itself. Counting the number of rings and entering the off-hook state (answering the call) is a relatively simple task for a microcomputer. One input to the microcomputer comes from a ring detector which determines when a ringing signal is present and signifies this condition by a change in DC voltage. An output signal from the microcomputer controls an electronic line switch to change the on-hook/off-hook status of the equipment.

The status of the telephone line (on-hook/off-hook) is monitored by line status circuit 140. Block 310 indicates this operation. When any station answers an incoming call, the microcomputer responds by activating the "line sniff" lead which jointly operates high impedance switch 210 and increases the gain of the receiving amplifier within voice hybrid 250. Signals present on the telephone line are now connected to modem 300 which indicates the presence of 2025 Hz on its Carrier Detect output lead. When the identification signal (2025 Hz) is present on the line, the secondary stations are temporarily disconnected. This is accomplished by activating line grab relay 115. Blocks 313 and 316 indicate that a response tone (1070 Hz) is transmitted to the calling party after the 2025 Hz tone has been received. At this time, low impedance switch 220 is deactivated so that the station returns to an on-hook state (i.e., the station hangs up). If the 2025 Hz tone is not present after the secondary stations are disconnected, then they are reconnected as indicated in block 314. This situation is encountered when one of the secondary stations responds to the incoming call with its own 2025 Hz tone. Since detection of this tone is nearly instantaneous, the interruption suffered by the secondary stations is not noticed. Blocks 315, 317 and 313 each indicate the steps of setting R=0. This activity resets to 0 the memory location used to store the number of incoming rings so that the home security system will require R rings the next time around.

Figure 5:
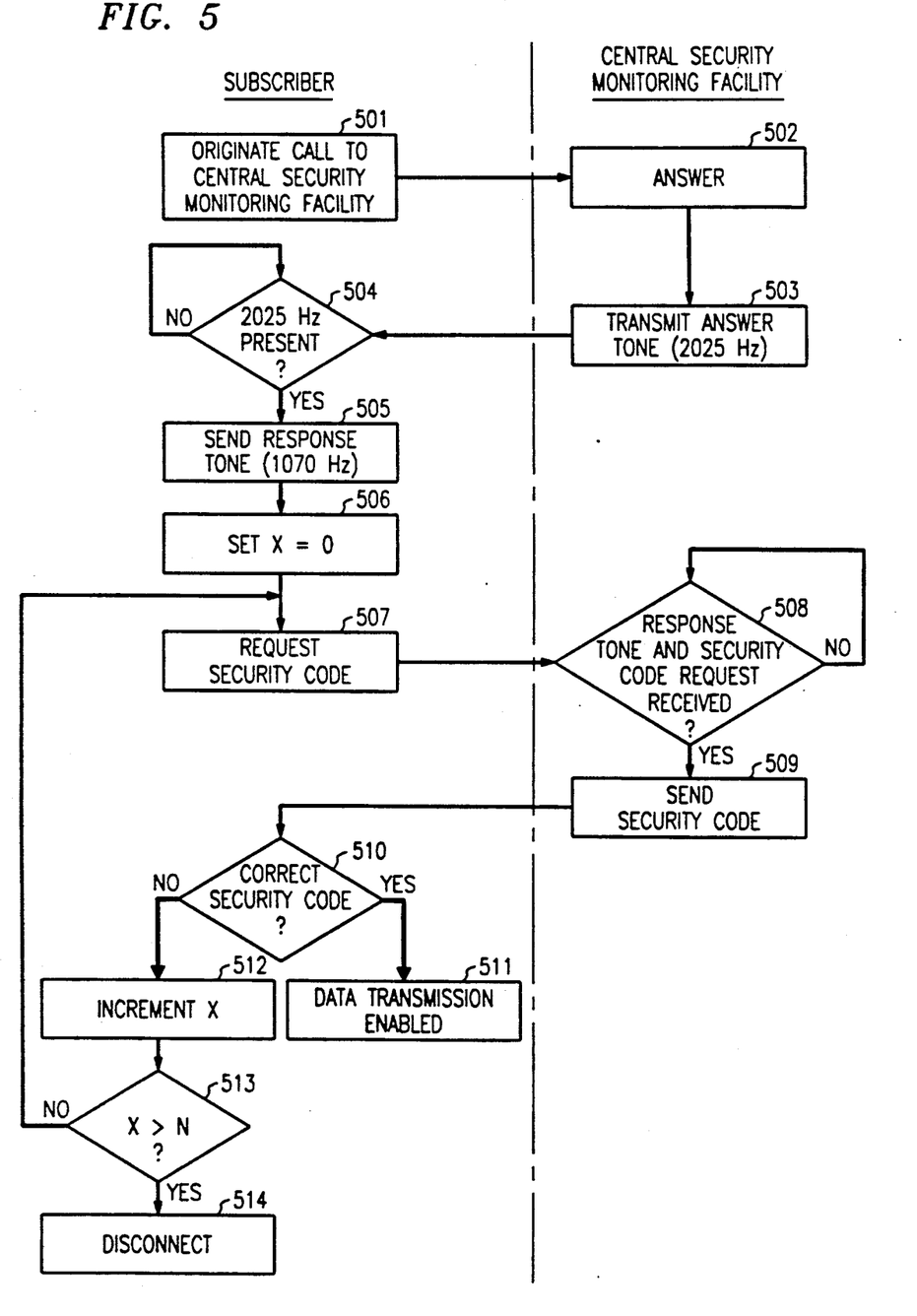
FIG. 5 discloses a flow diagram of an authentication subroutine used in the present invention.

Authentication subroutine 500 then proceeds as indicated in FIG. 5. The authentication function verifies that the calling party is authorized to interact with the primary station (home security system). One well-known authentication procedure comprises the use of a security code or personal identification number. The present system improves this procedure by terminating the incoming telephone call after the identification signal has been received and then dialing a predetermined telephone number that corresponds to the central security monitoring facility so that those who would improperly access the home security system, and try various security code combinations in an attempt to compromise the integrity of the system, will be foiled.

Referring now to FIG. 5, block 501 discloses the step of dialing the central security monitoring facility where the call is answered (block 502) and then an answer tone of 2025 Hz is returned to the subscriber (block 503). After verifying the presence of 2025 Hz, a response tone of 1070 Hz is transmitted to the monitoring facility (blocks 504, 505). A counter whose instantaneous magnitude is designated X is set to 0 at this time (block 506) so that the number of times that the presumed central security monitoring facility can send an incorrect security code can be counted and limited to N before disconnecting (blocks 510-514). This procedure injects a substantial time delay into the authentication process so that repeated attempts, by an intruder, at guessing the security code will require an inordinate amount of time. Blocks 507-509 correspond to the steps of requesting the security code and the recognition and transmission of same. Once the correct security code is received, data transmission between the home security station and the monitoring facility is enabled (blocks 510-511).

Although a particular embodiment has been shown and described, it is understood that various modifications are possible within the spirit and scope of the invention. These modifications include, but are not limited to, (i) the use of an identification signal other than a single frequency tone, an example would be a modulated signal which is encoded with the security code, and (ii) call identification apparatus that is physically separate from the primary station that it serves.

We claim:

1. Apparatus for distinguishing incoming call destination between a primary station and at least one secondary station, said primary and secondary stations being connected to a common telephone line,
characterized by:

means for detecting the presence of a predetermined identification signal on the telephone line after the incoming call has been answered by the secondary station;

switching means responsive to the presence of the predetermined identification signal for disconnecting the secondary station from the telephone line so that only the primary station remains connected thereto, said switching means reconnecting the secondary station if the identification signal disappears from the telephone line when the secondary station is disconnected therefrom;

means responsive to a continued presence of the predetermined identification signal on the telephone line after the secondary station is disconnected for terminating the incoming call; and means for dialing a predetermined telephone number subsequent to the termination of the incoming call.

2. The apparatus of claim 1 further including means, responsive to a security code transmitted by a facility connected at the distant end of the telephone line, for enabling data transmission between the distant facility and the apparatus, whereby an authentication procedure enhances the security of the apparatus.

3. The apparatus of claim 2 further including means for disconnecting the distant facility after N incorrect security codes are received.

4. The apparatus of claim 1 wherein the identification signal comprises a single frequency tone.

5. The apparatus of claim 4 wherein the frequency of the single frequency tone is 2025 Hz.

6. A method for responding to ringing signals on a telephone line in order to differentiate incoming call destination between a primary station and a secondary station, the primary and secondary stations being connected to a common telephone line, the method comprising the steps of:

waiting for the secondary station to respond to the ringing signals by answereing the incoming call;

detecting the presence of a predetermined identification signal on the telephone line;

disconnecting the secondary station from the telephone line to determine whether the identification signal is being generated by the calling party or by the secondary station;

terminating the incoming call when the identification signal is being transmitted by the calling party and, thereafter, dialing a predetermined telephone number; and reconnecting the secondary station to the telephone line when the identification signal is not being transmitted by the calling party.

7. The method of claim 6 further including the steps of:

receiving a security code transmitted by the facility reached at the predetermined telephone number;

determining whether the security code is correct; and enabling data transmission between the facility and the primary station when the security code is correct.

8. The method of claim 6 further including the steps of:

receiving a security code transmitted by the facility reached at the predetermined telephone number;

determining whether the security code is correct; and terminating the call when the security code is incorrect.

9. The method of claim 6 wherein the predetermined identification signal comprises a single frequency tone at 2025 Hz.

* * * * *